United States Patent [19]

Berglund et al.

[11] Patent Number: 5,062,816
[45] Date of Patent: Nov. 5, 1991

[54] AQUATIC SPORTING DEVICE

[75] Inventors: Andrew Berglund; James A. James, both of Northfield; James B. Easley, Minneapolis, all of Minn.

[73] Assignee: Zonco, Inc., Northfield, Minn.

[21] Appl. No.: 546,914

[22] Filed: Jul. 2, 1990

[51] Int. Cl.⁵ ............................................. B63H 16/04
[52] U.S. Cl. ...................................... 440/101; 416/74
[58] Field of Search ............... 440/101, 102, 104, 105, 440/106, 107, 108; 441/56, 65, 76–77; 416/69–74; D12/215, 239, 240; 403/329, 330, 361

[56] References Cited

U.S. PATENT DOCUMENTS

| 1,233,876 | 7/1917 | Hause | 403/329 |
| 2,343,726 | 3/1944 | Witt | 416/74 |
| 2,745,119 | 5/1956 | Whipple | 441/56 |
| 2,893,021 | 7/1959 | Lundborg | 416/63 |
| 2,941,218 | 6/1960 | Read | 441/56 |
| 3,030,641 | 4/1962 | Ake | 114/221 R |
| 3,039,120 | 6/1962 | Powell et al. | 441/56 |
| 3,107,371 | 10/1963 | Thompson | 441/59 |
| 4,233,925 | 11/1980 | Proctor | 440/101 |
| 4,493,663 | 1/1985 | Richmond | 440/101 |

FOREIGN PATENT DOCUMENTS 2604597 8/1977 Fed. Rep. of Germany ...... 440/101
3411263 10/1985 Fed. Rep. of Germany ..... 114/39.2

OTHER PUBLICATIONS

"Sculling Over the Stern", *The Rudder*, vol. 7, No. 5, pp. 26, 27, Percy W. Blandford.

*Primary Examiner*—Jesus D. Sotelo
*Attorney, Agent, or Firm*—Haugen and Nikolai

[57] ABSTRACT

An aquatic sporting device, designed for use with one arm, is formed of three removably attached sections including a paddle blade, a forearm brace, and an elongate longitudinal shaft between the blade and brace. The brace is offset both longitudinally and transversely from a proximal end of the shaft, to permit placement of the brace against the forearm at the elbow, yet permit full bending of the arm at the elbow. A hand gripping area is provided along the shaft, and enables selective gripping along the shaft length to facilitate positioning of the elbow with respect to the brace for maximum paddling leverage, regardless of the size of the forearm. When removed from one another, the sections can be conveniently stored or transported. The removable mounting further permits substitution of other working implements, such as a fish net or gaff hook, in lieu of the paddle blade.

17 Claims, 4 Drawing Sheets

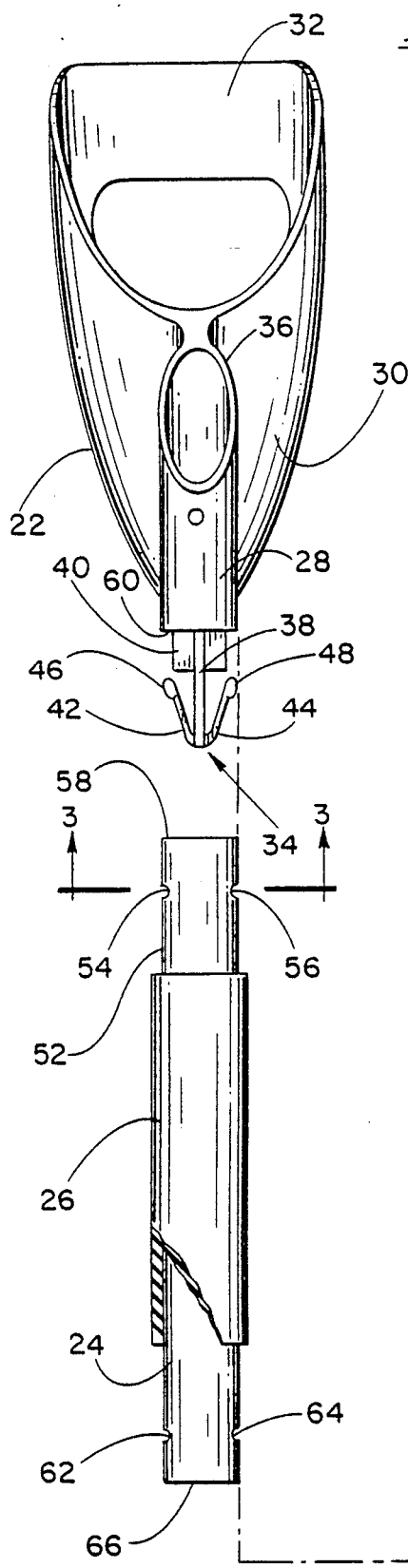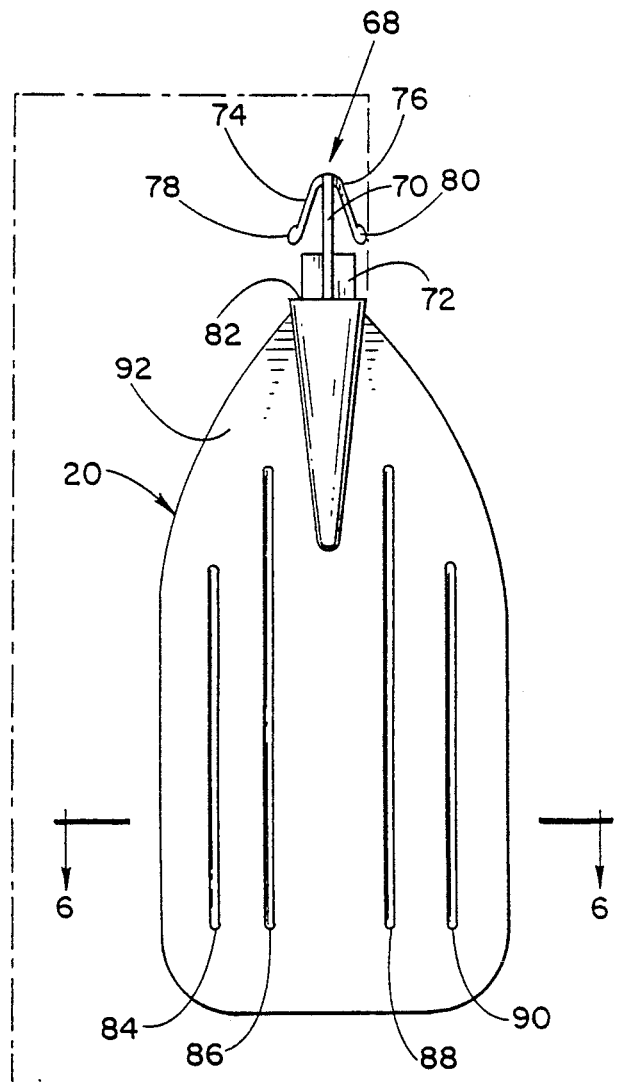
Fig.-2

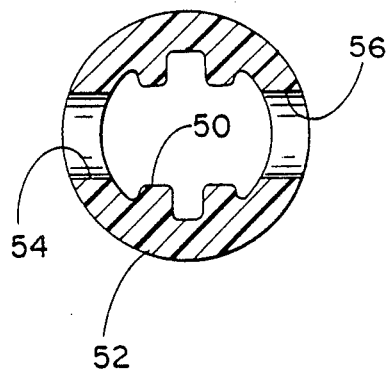
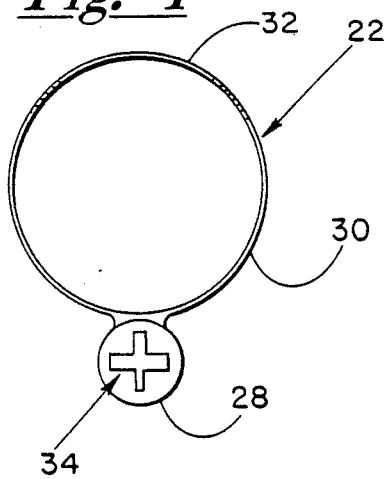
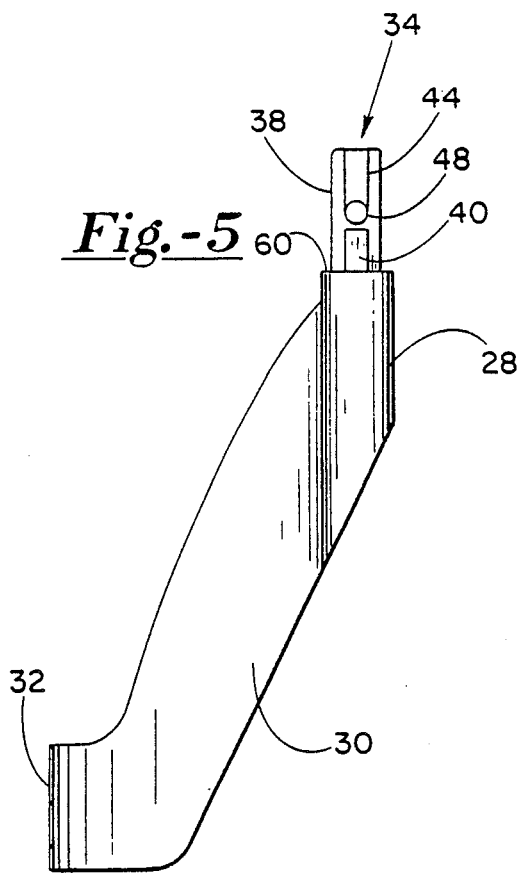
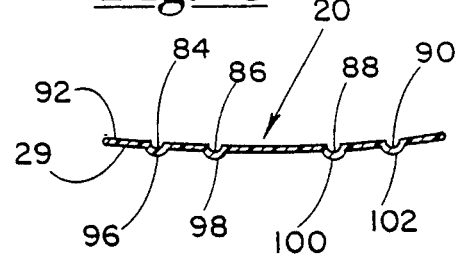
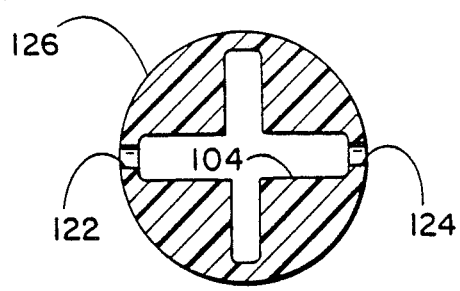

AQUATIC SPORTING DEVICE

FIELD OF THE INVENTION

The present invention relates to equipment used for fishing and other water recreation, and more particularly to oars or paddles used to propel and control watercraft.

BACKGROUND OF THE INVENTION

Water paddles or oars which are now commercially available typically have a single long handle for gripping by one or two hands. Such paddles or oars are commonly used for canoes, rowboats and the like. Known paddles for smaller flotation crafts, such as small rafts, have commonly been designed as shorter versions of such oars. These smaller paddles require gripping by two hands, or a set of oar locks when controlled with one hand.

A number of paddles have been designed for use with one hand, for example U.S. Pat. No. 4,493,663 (Richmond) discloses a blade, a brace for the arm at the opposite end, and a hand grip intermediate the blade and arm brace. The arm brace is resilient and thus suited to releasably grip forearms of different sizes. U.S Pat. No. 2,893,021 (Lundborg) discloses a water ski pole with a forearm brace at its top, and a handle somewhat below the brace.

Such devices, while adapted for use with one arm or by both arms in pairs, are limited in their ability to accommodate individuals of different size and physical makeup. While it is known to make a forearm brace adjustable to accommodate various forearm circumferences, the positioning of the hand grip predetermines the distance from the hand to the forearm brace. Accordingly, such a device when sized appropriately for one user does not suit another, either positioning a forearm brace above the elbow or failing to use the available leverage corresponding to the distance from the hand to a forearm region near the elbow. The conventional forearm brace extends normal to the shaft or arms on which it is mounted. As perhaps best seen from the Lundborg patent, this arrangement prevents the optimal positioning of the forearm brace near or at the elbow for maximum leverage, because such positioning would place the end of the pole in a position to jab the arm or otherwise interfere with full flexure of the arm at the elbow. Yet another disadvantage of conventional devices is the difficulty in handling and transporting them.

Therefore, it is an object of the present invention to provide a paddle suited for manipulation with one arm, and for a universal fit which is virtually independent of the range of forearm girth and distance between hand and forearm among potential users.

Another object of the invention is to provide a watercraft paddle with a forearm brace positioned to bear upon the forearm at the elbow during use for maximum leverage, and yet avoid interfering with full flexing of the elbow.

A further object is to provide a water paddle in which the paddle blade exhibits improved lateral stability for increased ease of use and reliability.

Yet another object is to provide an aquatic sporting device assembly of plural sections, removably attached for more convenient transport and storage, with interchangeable working implements to provide versatility.

SUMMARY OF THE INVENTION

To achieve these and other objects, there is provided an aquatic sporting device suited for manipulation with one arm. The device includes an elongate, longitudinally extended shank with proximal and distal ends, and a hand gripping region along the shank between the proximal and distal ends. A rigid bracing means is mounted at the proximal end of the shank and extends away from the shank. The bracing means includes a bracing segment parallel to the shank and proximally and laterally spaced apart from the proximal end, and thus positioned to bear against the elbow of the arm when the hand is closed about the shank along the gripping region. This positions the forearm substantially longitudinally, i.e. parallel to the shank. A working implement is mounted at the distal end of the shaft for generally lateral movement with the shank, accomplished by laterally moving the hand that grips the shank while the bracing segment bears against the elbow.

The bracing means preferably surrounds the arm and has an annular lateral profile. An arcuate support segment of the bracing means is mounted to the shank, while a bracing segment, also arcuate, is mounted to the support segment and remote from the shaft. This arrangement has the advantage of positioning the bracing segment directly adjacent the elbow to bear against the elbow when the arm is inserted within the bracing means. At the same time, the opposite side of the bracing means is distal relative to the elbow, and thus does not poke or jam against the elbow, or otherwise interfere with a full flexing of the elbow.

Most frequently, the working implement is a paddle blade centered on a shank and extended laterally of the shaft. The paddle blade preferably has a concave forward face with longitudinal grooves in the face providing a channeling action as the paddle blade is swept through the water. The concave face and channeling action combined to enhance lateral stability.

Alternatively, the working implement can be a fishing net or a gaff hook. Most preferably, the sporting device includes three removably attached parts including a central shaft forming the shank, the working implement, and a brace at the opposite end of the shaft from the working implement. A paddle blade, net and hook can comprise interchangeable parts for a single assembly. Accordingly, another aspect of the present invention is an attachment means for removably connecting the paddle, net or gaff hook, and the brace, to the intermediate shaft. Each implement and the brace has a longitudinal protrusion which nests into one of two recesses in the shaft at its proximal and distal ends, respectively. Nodules, mounted to the protrusions by flexible arms, enter openings of the shaft as the protrusions by flexible arms, enter openings of the shaft as the protrusions are nested, thus to secure the assembly. A tool is employed to remove the nodules from the openings against the biasing force of the flexible arms, to free the implement and brace from the shaft when desired. Alternatively, the arms can have increased flexibility such that no tool is needed.

Thus, in accordance with the present invention, a paddle, fish net or gaff hook assembly can be constructed out of conveniently stored separate parts. The assembled paddle, through a unique brace design in combination with a gripping area along a longitudinal shaft, allows positioning the brace against the forearm at the elbow for maximum leverage, regardless of the size of the individual's forearm. This provides enjoyment of canoeing and other water sports, and beneficially exercises the muscles of the forearm, shoulders and chest.

IN THE DRAWINGS

The above objects and advantages are more readily appreciated upon consideration of the following detailed description and the drawings, in which:

FIG. 2 is an exploded forward elevation illustrating three removably mounted sections of the paddle;

FIG. 3 is a sectional view taken along the line 3—3 in FIG. 2;

FIG. 4 is a bottom end view of a brace of the paddle shown in FIG. 2;

FIG. 5 is a side elevation of the brace;

FIG. 6 is a sectional view taken along the line 6—6 in FIG. 2;

FIG. 7 is a sectional view similar to that in FIG. 3 showing an alternative female connector structure;

DETAILED DESCRIPTION OF THE PREFERRED EMBODIMENTS

Figure 1:
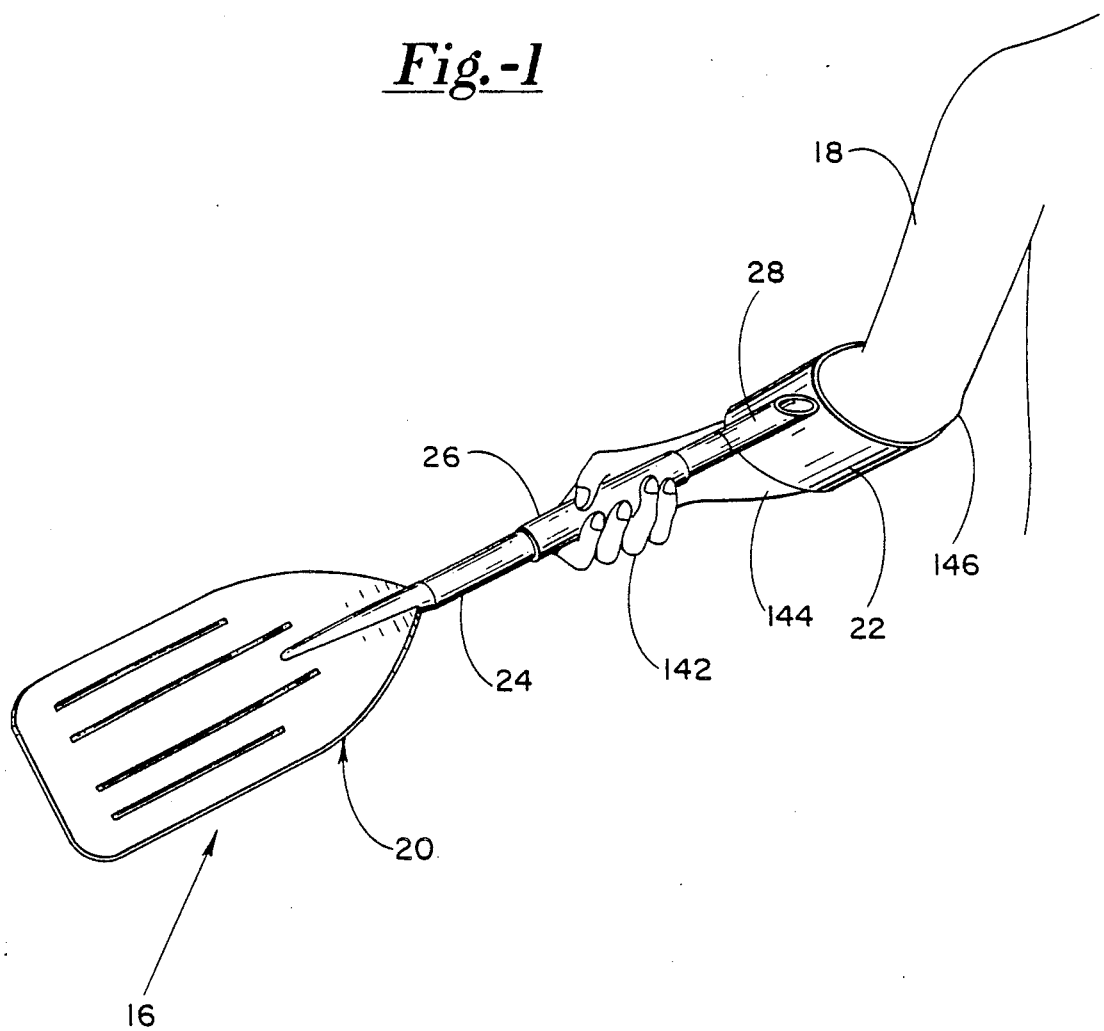
FIG. 1 is a perspective view of a watercraft paddle constructed in accordance with the present invention, indicating positioning of the paddle on the forearm.

Turning now to the drawings, there is shown in FIG. 1 a paddle 16 suited for propelling a watercraft using one arm, as indicated at 18. The preferred means for propelling the watercraft is with two such paddles, one for each arm. The paddle includes a paddle blade 20 at its distal end, a forearm brace 22 in the form of an oversized ring, and an elongate and tubular shaft 24 intermediate the blade and brace. The blade, brace and shaft preferably are constructed of a lightweight plastic such as polyethylene, by casting, extrusion, injection molding or other known techniques. Surrounding shaft 24 along its medial region is an annular grip 26, preferably constructed of a closed cell EDM rubber or other elastomer suitable for hand gripping. In lieu of grip 26, a portion of shaft 24 could be gnarled or otherwise roughened to enhance hand gripping.

As seen in FIG. 2, brace 22, blade 20 and shaft 24 are removably mounted, and are conveniently detachable from one another for transport, storage or substitution of another working implement for blade 20 as is later explained. To describe the sections in FIG. 2, it is convenient to consider shaft 24 as longitudinally disposed, i.e. vertical as viewed in this figure.

Brace 22 includes a tubular shaft extension 28, a support segment 30, a bracing segment 32 and a male connector 34 for joinder to the medial shaft. As seen in FIG. 4, the support segment and bracing segment together form an annular loop, preferably about four and one half inches in diameter. Thus oversized, the loop provides a surrounding but not snug fit about the forearm near the elbow. As seen from FIGS. 4 and 5, the loop formed by segments 30 and 32 is transversely (laterally) offset from shaft extension 28, which is a longitudinal extension of shaft 24 in the fully assembled paddle. Support segment 30 is inclined, downwardly and transversely away from shaft extension 28 as viewed in FIG. 5, to locate the bracing segment both longitudinally and transversely spaced apart from the shaft extension. The lateral offset equals the loop diameter, i.e. preferably about four and one-half inches, while the longitudinal or vertical offset is preferably about two inches from a proximal end 36 of extension 28.

Male connector 34 includes a distally protruding, flat and substantially rigid guide member 38, and a perpendicular member 40 also extended distally of the shaft extension, a distance about half the length of the guide member. A pair opposed flexible arms 42 and 44, mounted at the distal end of guide member 38 extend proximally and at their free ends support nodules 46 and 48, respectively.

As seen in FIG. 3, a recess 50 is formed in the upper or proximal end 52 of shaft 24, and sized to nestingly receive male connector 34, particularly guide member 38. Apertures at 54 and 56 extend through the wall of the tubular shaft, and are positioned to receive nodules 46 and 48 upon insertion of male connector 34 into the recess, to the point where respective shoulders 58 and 60 of the shaft and brace abut one another. Brace 22 is disassembled from shaft 24 by hand or by a tool (not shown) used to force nodules 46 and 48 inwardly against the biasing force of arms 42 and 44, until the nodules are completely free of the apertures, which permits sliding removal of the male connector from recess 50.

Apertures 62 and 64 and shoulder 66, at the bottom or distal end of shaft 24, allow the removable connection of blade 20 and shaft 24 in substantially the same manner as the brace is connected to the shaft proximal end. Accordingly, a male connector 68 extends upwardly of the paddle blade, and includes a guide member 70, perpendicular member 72, flexure arms 74 and 76, nodules 78 and 80 supported at the free ends of the arms, and a shoulder 82 positioned to abut shoulder 66 when the nodules enter the apertures.

A series of longitudinal grooves 84, 86, 88 and 90 are formed in a forward face 92 of blade 20. On a rearward face 94 of the blade are a plurality of longitudinal ribs or rises 96, 98, 100 and 102. The ribs and grooves are advantageously aligned with one another, as is shown in FIG. 6. Also apparent is the concavity of forward face 92, while the rearward face is convex. The concave forward face and grooves or channels 84-90 enhance the lateral stability of paddle 16 as compared to a flat bladed paddle not provided with such grooves. The longitudinal orientation of the grooves encourages a rapid flow or channeling action of water as the paddle is used to propel the watercraft. The channeling action, along with the slightly concave forward surface, discourages rotation of the paddle about the longitudinal axis and thus maintains lateral stability.

The alignment of the ribs and grooves reinforces the paddle blade to permit a thinner, lighter weight blade. The thickness of the blade is slightly greater at the periphery as opposed to the paddle interior lending structural support where required while minimizing weight.

Figure 8:
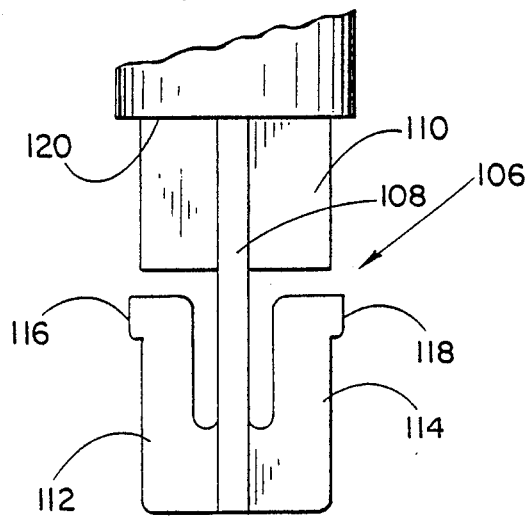
FIG. 8 is a forward elevation showing an alternative male connector structure.
Figure 9:
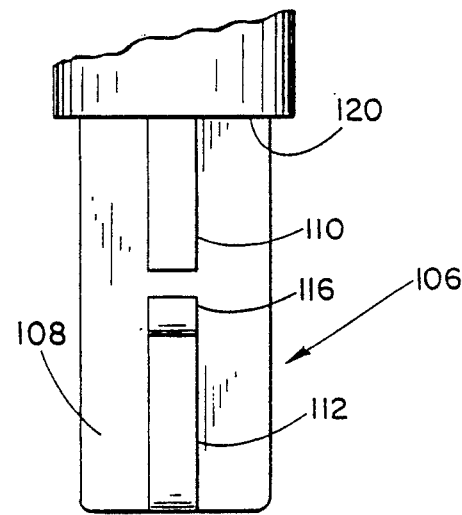
FIG. 9 is a side elevation showing the alternative male connector structure.

FIGS. 7-9 illustrate an alternative connecting structure for the assembly. In particular, FIG. 7 illustrates a recess 104 in the shape of a cross, to more securely nest an alternative male connector 106 having a corresponding profile. Male connector 106 includes a guide member 108, a perpendicular member 110 and opposed flexible arms 112 and 114 respectively supporting nodules 116 and 118. The guide and perpendicular members protrude from a transverse or lateral shoulder 120. Openings 122 and 124 (FIG. 7) are provided in a shaft 126 similar to shaft 24, for capturing the nodules. As before, the proximal end of the shaft serves as a shoulder. While not shown, a substantially similar connector structure is provided at the other end of the shaft.

Figure 10:
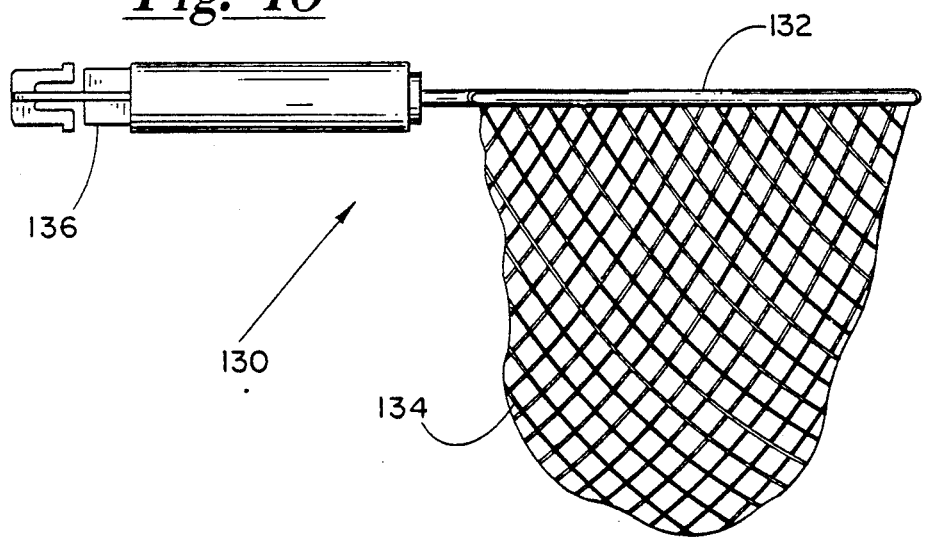
FIG. 10 is an elevation of a fishing net for mounting to the shaft in lieu of the paddle.
Figure 11:
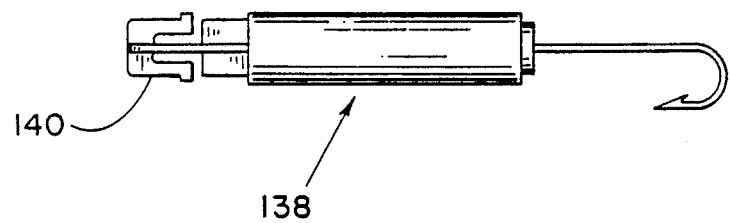
FIG. 11 illustrates a gaff hook for mounting to the shaft in lieu of the paddle.

FIGS. 10 and 11 show alternative working implements which can be attached to shaft 24 in lieu of paddle blade 20. More particularly, a fish net 130 in FIG. 10 includes a rigid annular rim 132, a netting 134 depending from the rim, and a male connector 136 projected radially from rim 132, similar in structure to connector 34. Likewise, a gaff hook 138 in FIG. 11 is provided with a substantially identical male connector 140.

Paddle 16 is placed on the arm for use as shown in FIG. 1. More particularly, as the hand 142 is closed about grip 26, brace 22 surrounds the forearm 144, with bracing segment 32 positioned to contact the arm near the end of the forearm, at the elbow 146.

Two advantages of the present invention are apparent from FIG. 1. First, the hand closes about grip 26 in a longitudinal orientation, somewhat similar to the manner of gripping a tennis racket. This permits a wide range for hand positioning along the grip, such that bracing segment 32 can be positioned opposite the elbow for maximum leverage, regardless of the size of the individual's forearm. Secondly, the inclined support segment 30 enables the bracing segment to contact the elbow without any portion of the shaft or brace along the opposite side of the elbow. Consequently, the elbow may be fully flexed to bend the arm, without any poking or other interference from the brace or shaft. This permits the user of the paddle to employ either of two strokes: a long stroke achieved by keeping the arm straight and rotating the arm at the shoulder; or a short stroke achieved by bending the arm at the elbow while keeping the upper arm substantially immobile. Of course, a combination of these two strokes could be employed.

The removable mounting of various sections enhances utility particularly for fishing. Once a watercraft has been guided to a desired fishing location, the operator can replace the paddle blade with fish net 130 or gaff hook 138 as desired.

What is claimed is:

1. An aquatic sporting device suited for manipulation with one arm, said device including:
   an elongate, longitudinally extended shank having proximal and distal ends, and a hand gripping region along the shank between the proximal and distal ends;
   a rigid bracing means including a support segment mounted at the proximal end of the shank and extended away from the shank and a bracing segment mounted to the support segment, said support segment supporting the bracing segment parallel to the shank and proximally and laterally spaced apart from said proximal end, positioned for bearing against an elbow of the arm when a hand of the arm is closed about the shank along the gripping region, with a forearm portion of the arm in substantially parallel relation to the shank, and shaped to permit full flexing of the elbow with the bracing segment bearing against the elbow; and
   a working implement mounted at the distal end of the shank for lateral movement with the shank by laterally moving the hand gripping the shank while the bracing segment bears against the elbow.

2. The aquatic device of claim 1 wherein:
said bracing means surrounds the arm.

3. The aquatic device of claim 2 wherein:
said bracing means is annular in lateral profile and has a diameter in the range of from about three and one half to about five and one half inches.

4. The aquatic device of claim 3 wherein:
said support segment is arcuate and inclined to extend proximally and laterally away from the shank, and wherein the bracing segment is mounted to the support segment at portions thereof remote from the shank.

5. The aquatic device of claim 1 wherein:
said implement comprises a paddle blade centered on the shank and extended longitudinally of the shank, said blade having a concave forward face, with said lateral movement being forward.

6. The aquatic device of claim 5 further including:
a plurality of spaced apart longitudinally extended channels along the forward face of the blade.

7. The aquatic device of claim 6 further including:
a plurality of elongate, longitudinally extended stiffening ribs protruding outwardly of a rearward face of the blade.

8. The aquatic device of claim 7 wherein:
said channels and ribs are aligned and opposite one another.

9. The aquatic device of claim 1 wherein:
said implement is a fishing net.

10. The aquatic device of claim 1 wherein:
said implement is a gaff hook.

11. The aquatic device of claim 1 wherein:
said shank comprises a tube circular in lateral profile, and said gripping region includes an annular pad of a flexible elastomeric material, mounted in surrounding relation to the shank.

12. A paddle assembly suited for manipulation with one arm, said paddle assembly including:
   an elongate, longitudinally extended tubular shaft having proximal and distal ends, and a hand gripping region along the shaft between the proximal and distal ends;
   an annular bracing member for surrounding the arm, said bracing member releasably connected to the proximal end of the shaft, said bracing member including an arcuate support segment releasably attached to the shaft and an arcuate bracing segment mounted to the support segment and remote from the shaft, said support segment being inclined to extend proximally and laterally away from the proximal end of the shaft, thereby to position the bracing segment in proximal and lateral spaced apart relation to the shaft;
   a paddle blade member;
   a first attachment means for removably connecting the blade member to the distal end of the shaft, including a male connector structure integrally mounted to one of said shaft and blade member, and a female connector structure integrally mounted to the other of said shaft and blade member;
   said male connector structure including a longitudinal protrusion, at least one nodule, a flexible means for supporting each nodule for movement laterally toward and away from the longitudinal protrusion, and a first lateral shoulder; and wherein the female connector structure includes a longitudinally inwardly extended recess with a lateral profile substantially conforming to the lateral profile of said protrusion, one opening corresponding to each said nodule, and a second lateral shoulder;

said first and second shoulders positioned with respect to their associated nodules and openings respectively, whereby each of the nodules enters its associated opening as the first and second shoulders abut one another with the protrusion nestingly engaged within the recess, the restoring force of said flexible means resisting removal of the nodules from the openings, to maintain the shaft and blade member engaged with one another, said nodules moveable out of their respective openings against the restoring force to release the blade member and shaft.

13. The paddle assembly of claim 12 wherein:

said female connector structure is integral with said shaft, and said male connector structure is integral with said blade member.

14. The paddle assembly of claim 13 wherein:

the male connector structure includes two of said nodules, and said flexible means includes two flexible longitudinal arms each mounted at one end to the protrusion, each of the arms supporting its associated nodule at its free end, and wherein the female connector structure includes two of said openings in the shaft.

15. The paddle assembly of claim 14 further including:

a second attachment means for releasably connecting said bracing member to the proximal end of said shaft, substantially identical to said first attachment means.

16. A paddle apparatus suited for manipulation with one arm in propelling a watercraft, said paddle apparatus including:

an elongate, longitudinally extended tubular shaft having proximal and distal ends and a gripping region along the shaft between the proximal and distal ends;

a bracing member, extended longitudinally and circular in lateral profile, mounted to the proximal end of the shaft in parallel, offset relation thereto, the bracing member including an arcuate support segment attached to the shaft and an arcuate bracing segment mounted to the support segment and remote from the shaft, said support segment inclined to extend proximally and laterally away from the proximal end of the shaft, thereby to position the bracing segment in proximal and lateral spaced apart relation to the shaft;

a paddle blade mounted to the distal end of the shaft and extended distally away from the shaft, said blade including a concave forward face and a convex rearward face opposite the forward face, a plurality of longitudinally disposed grooves formed in the forward face and a plurality of elongate, longitudinally extending ribs protruding outwardly from the rearward face, said grooves and ribs opposite and aligned with one another.

17. The paddle apparatus of claim 16 wherein:

the bracing member has a diameter selected for a loose, surrounding relation to the arm at the forearm and the elbow when the hand is closed about the gripping region, whereby forward movement of the hand, with the paddle blade submerged in water, causes the bracing segment to bear against the forearm at the elbow.

* * * * *